Figure 2:
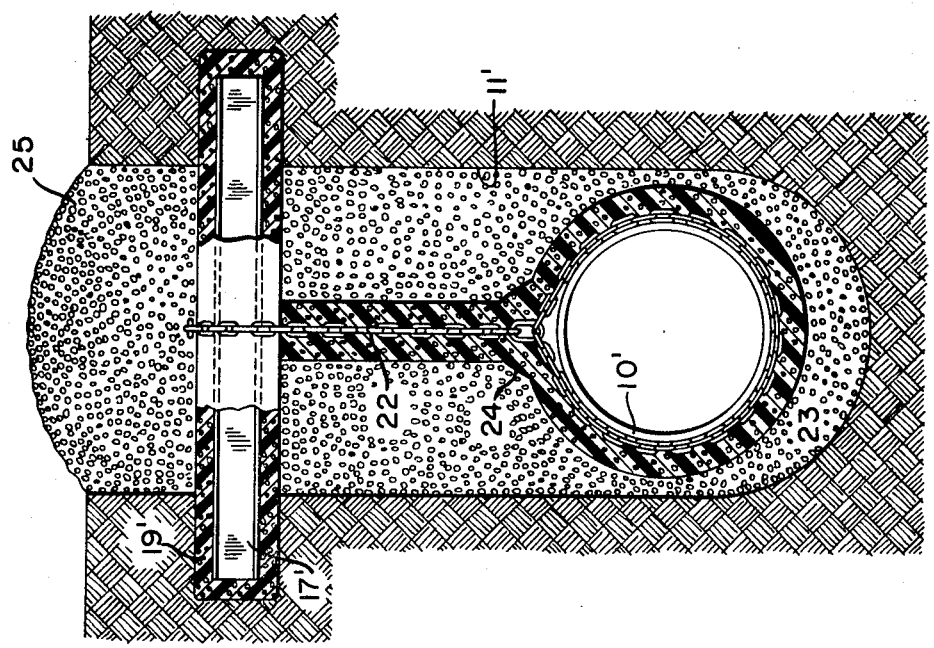

United States Patent [19]

Empson

[11] 3,722,225
[45] Mar. 27, 1973

[54] PIPELINE SUSPENSION SYSTEM

[76] Inventor: Herbert G. Empson, 2027 Lynwood Terrace, San Jose, Calif. 95128

[22] Filed: Nov. 2, 1970

[21] Appl. No.: 86,236

[52] U.S. Cl. ............61/72.1, 138/105, 138/107, 248/60
[51] Int. Cl. .............................F16l 1/00, F16l 3/00
[58] Field of Search .....61/72.1, 72.5, 72.7; 138/105, 138/107; 248/60

[56] References Cited

UNITED STATES PATENTS

| 1,680,280 | 8/1928 | Boosey | 138/105 |
| 3,313,321 | 4/1967 | Keller | 138/105 |
| 2,772,126 | 11/1956 | Guy | 248/60 X |
| 2,355,966 | 8/1944 | Goff | 61/72.1 X |
| 3,298,173 | 1/1967 | Empson | 59/78 |

*Primary Examiner*—Jacob Shapiro
*Attorney*—Oberlin, Maky, Donnelly & Renner

[57] ABSTRACT

The pipe is suspended in spaced relation within a ground trench by a chain sling connected to a cross beam by a shock absorber. The pipe and such suspension are fully enclosed by plastic foam formed in place or applied as a wrapping.

9 Claims, 2 Drawing Figures

PATENTED MAR 27 1973

3,722,225

INVENTOR.
HERBERT G. EMPSON
BY
Oberlin, Maky, Donnelly & Renner
ATTORNEYS

PIPELINE SUSPENSION SYSTEM

The present invention relates to pipeline suspension and is concerned in particular with a system which can be used safely to suspend a line carrying crude oil or the like in arctic or other regions of extreme cold.

A prominent example at the present time is the pipeline under consideration for conveying crude oil from wells located on the North Slope of Alaska several hundred miles to a port on the Pacific Ocean for handling and transshipment. This line would extend for a substantial distance over permanently frozen earth, which presents a first problem of anchoring the line in such manner that heat from the oil will not reach the areas of ground engagement and, by thawing, impair the support. The oil in this case has a temperature of about 160° F as produced at the wellhead and will probably be kept at about this temperature as an average in its passage through the line.

The region traversed by such trans-Alaska line, moreover, includes significant fault lines in the earth, so that tremors of varying degree must be expected, including the shock of a major earthquake. The concern in this instance is of course to maintain the integrity of the line generally and to avoid rupture which could cause massive spillage. Cessation of the flow for any reason, for example, because of pump shut-down or failure at one of the many pumping stations that would be employed, would result in freezing of oil retained in the line.

Since the route for the line as proposed crosses habitual paths of movement of wild animals, there has also been expressed concern for the preservation of such animal life and it is desired that the line should not impede such migratory movement.

The foregoing requirements are believed to be met by the present invention which, basically, provides an embedded line in thermal and shock isolation from the earth.

The new suspension system further provides an exterior seal for the line to contain the oil in the event that cracks or ruptures occur in the pipe.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
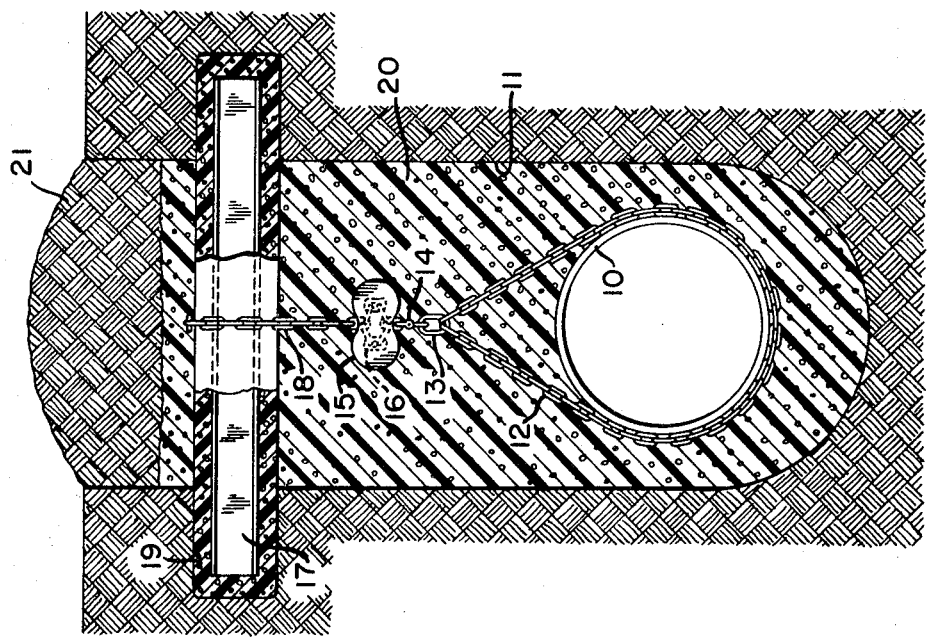

In said annexed drawing:

FIG. 1 illustrates in vertical section a pipeline section supported by a first form of the new suspension system, and FIG. 2 illustrates a second form in similar fashion.

Referring more particularly to FIG. 1, a metal pipe 10 is disposed within a fairly deep ground trench 11, well below the mouth of the same and spaced from the sidewalls and bottom as shown.

The illustrated section of the pipe is held in such placement by a chain basket 12 through which it is inserted, and the master oblong line 13 of the basket is connected to a coupling link 14. The latter in turn is connected to one side of a shock absorber 15 comprising two chain loops 16 embedded within a molded body of resiliently deformable material, such as rubber or polyurethane, and reference may be had to my U.S. Pat. No. 3,298,173 for a more detailed discussion of this type of expandable link with shock absorbing capability.

The shock absorber is suspended from a horizontal beam 17 by a chain 18 looped about the beam. The latter bridges the trench horizontally, again appreciably below the ground surface, and is covered with a wrapping 19 of foamed polyurethane or equivalent material. The wrapped beam ends are embedded in the earth at the respective sides as shown to suspend the section of the pipeline, and it will be understood that the full suspension system for the line will involve a plurality of such assemblies spaced longitudinally along the line at intervals appropriate for support of the weight of the pipe and the oil therein, for example, on the order of fifteen feet.

The trench is filled to a level above the beam with a closed cell resin foam 20, preferably polyurethane which is formed in situ. The upper portion of the trench is then filled with earth 21 to a depth preferably on the order of about three feet to complete the installation.

The suspension in this first form thus is essentially in the nature of a sling supporting the pipe, with cable as well as the illustrated chain suitable for the purpose, so that the pipe is relatively free to move in all directions. The shock absorber dampens relative movement and, in particular, longitudinal sway which may develop as a result of variably experienced tremors along the length of the line.

The foam which fully encloses the suspension has some cushioning effect, but primarily serves as thermal insulation to contain heat in the pipe, the beam ends of course being isolated by the insulative wrapping thereof. The oil is thus maintained in liquid state, while surrounding permafrost is protected from the heat in the pipe. In the event that the flow of the oil in the pipe is found to generate excessive heat therein, the insulation can in effect be breached at appropriate intervals to provide a predetermined amount of heat loss to the atmosphere, for example, by conductors extending from contact with the pipe at selected intervals.

The foam surround is, as previously noted, a closed cell body and will, therefore, contain leakage resulting from any cracks or ruptures which might occur along the length of the pipe while the foam remains intact. Other plastics, such as vinyl, could meet the same requirements set forth herein. Additional protection of this nature could also be realized by employing a solid liner, not shown, within the pipe of polyurethane or some other smooth material equally resistant to the oil.

With reference now to the FIG. 2 form of the suspension, the same utilizes a similarly formed ground trench 11' and like placement of the pipe 10' therein. Beam 17' and its insulative wrapping 19' are also similar, with a relatively extended chain length 22 hanging from the same and connected to a chain loop 23 which embraces the pipe more closely.

In this second case, the chain length 22 and pipe, with chain 23 thereabout, are fully enclosed by closed cell foamed polyurethane 24 in strip form or the like, that is, in separately formed condition, to provide the insulative and sealing surround. The thickness of such covering may be on the order of ten inches, and the trench is filled with gravel 25. The shock absorber of the first form of the suspension can be included and, if so, would be covered as well with the insulating material.

The wrapping can be applied and secured in any suitable manner, such as by the use of steel strapping or the equivalent.

Enlargements in the form of plates or the like can be added at the ends of the beam for additional support if desired, and it will be understood that the particular illustrated manner of engaging the chain with the pipe can be varied, for example, if it should prove inconvenient or impractical in a given installation to feed the pipe length through a formed basket.

I, therefore, particularly point out and distinctly claim as my invention:

1. A system for suspending a pipeline in a trench, the pipe being spaced from the trench sides and bottom, comprising flexible load-bearing sling means through which the pipe is inserted for supporting the same, anchor means supported by the walls of the trench securing the sling means to the wall and supporting the pipe freely within the latter, and foamed plastic fully surrounding the pipe and partially surrounding at least a portion of the sling means and a portion of the anchor means.

2. A system as set forth in claim 1, wherein the foamed plastic is formed by being foamed in place within the trench.

3. A system as set forth in claim 1, wherein the foamed plastic is in the form of a wrapping applied to the pipe.

4. A system as set forth in claim 1, including shock absorbing means for connecting the sling means to the anchor means.

5. A system as set forth in claim 4, wherein the foamed plastic fully surrounds the sling and anchor means.

6. A system as set forth in claim 1, wherein the plastic is a closed cell foam.

7. The method of suspending a pipeline which comprises the steps of preparing a trench of a depth and width appreciably greater than the diameter of the pipe, hanging the pipe on a support within the trench in spaced relation so that it is relatively free to move in all directions, and applying a closed cell plastic foam fully about the pipe and partially about at least a portion of the support within the trench to insulate and seal the same.

8. The method of claim 7, wherein the foam is applied by foaming the plastic within the trench about the pipe.

9. The method of claim 7, wherein the foam is applied as a wrapping about the pipe.

* * * * *